United States Patent
Garvin et al.

(10) Patent No.: US 8,342,926 B2
(45) Date of Patent: Jan. 1, 2013

(54) GAME AIM ASSIST

(75) Inventors: John Garvin, Bend, OR (US);
Christopher Reese, Bend, OR (US);
Darren Yager, Bend, OR (US); Ron Allen, Bend, OR (US)

(73) Assignee: Sony Computer Entertainment America LLC, Foster City, CA (US)

( * ) Notice: Subject to any disclaimer, the term of this patent is extended or adjusted under 35 U.S.C. 154(b) by 939 days.

(21) Appl. No.: 12/283,846

(22) Filed: Sep. 15, 2008

(65) Prior Publication Data
US 2010/0009733 A1 Jan. 14, 2010

Related U.S. Application Data

(60) Provisional application No. 61/080,266, filed on Jul. 13, 2008.

(51) Int. Cl.
*A63F 13/04* (2006.01)
*A63F 13/06* (2006.01)
(52) U.S. Cl. .................... 463/5; 463/7; 463/38
(58) Field of Classification Search .............. 463/5, 7, 463/38; 342/357.56
See application file for complete search history.

(56) References Cited

U.S. PATENT DOCUMENTS

| | | | |
|---|---|---|---|
| 4,701,130 A | 10/1987 | Whitney et al. | |
| 4,787,051 A | 11/1988 | Olson | |
| 4,843,568 A | 6/1989 | Krueger | |
| 5,128,671 A | 7/1992 | Thomas, Jr. | |
| 5,440,326 A | 8/1995 | Quinn | |
| 5,528,265 A | 6/1996 | Harrison | |
| 5,947,823 A | 9/1999 | Nimura et al. | |
| 6,017,272 A | 1/2000 | Rieder | |
| 6,072,571 A | 6/2000 | Houlberg | |
| 6,157,368 A | 12/2000 | Faeger | |
| 6,210,273 B1 | 4/2001 | Matsuno | |
| 6,273,818 B1 | 8/2001 | Komoto | |
| 6,283,861 B1 | 9/2001 | Kawai et al. | |

(Continued)

FOREIGN PATENT DOCUMENTS

EP 0 913 175 5/1999

(Continued)

OTHER PUBLICATIONS

Halo 2, released , Nov. 9, 2004, published by Microsoft Game studios, as evidenced by the web page http://nikon.bungie.org/misc/bungie_open_letter.html, downloaded from http://web.archive.org/web/20070129100341/http://nikon.bungie.org/misc/bungie_open_letter.html , with a archive.org verified date of Jan. 29, 2007.*

(Continued)

*Primary Examiner* — Peter DungBa Vo
*Assistant Examiner* — Nicholas Ditoro
(74) *Attorney, Agent, or Firm* — Lewis and Roca LLP

(57) ABSTRACT

Methods for game aim assist are provided. In electronic games, a game player may control the actions of a game character within a game environment. The game environment, which includes a focus area, may be displayed from a perspective of or with respect to a game character. During game play, one or more objects may be detected in the focus area. One of the objects may then be selected based on the distance between the object and the center of the focus area. The aim of the game character is then automatically adjusted toward the selected object, which allows the game player to direct an attack action on the object.

22 Claims, 9 Drawing Sheets

U.S. PATENT DOCUMENTS

| | | | |
|---|---|---|---|
| 6,319,121 B1 | 11/2001 | Yamada et al. | |
| 6,375,571 B1 | 4/2002 | Ohnuma et al. | |
| 6,375,572 B1 | 4/2002 | Masuyama | |
| 6,409,604 B1 | 6/2002 | Matsuno | |
| 6,413,163 B1 | 7/2002 | Yamauchi et al. | |
| 6,419,580 B1 | 7/2002 | Ito | |
| 6,533,663 B1 | 3/2003 | Iwao et al. | |
| 6,652,384 B2* | 11/2003 | Kondo et al. | 463/54 |
| 6,955,296 B2 | 10/2005 | Lusher et al. | |
| 6,992,596 B2 | 1/2006 | Cole et al. | |
| 7,121,946 B2 | 10/2006 | Paul et al. | |
| 7,137,891 B2* | 11/2006 | Neveu et al. | 463/31 |
| 7,158,118 B2 | 1/2007 | Liberty | |
| 7,239,301 B2 | 7/2007 | Liberty et al. | |
| 7,262,760 B2 | 8/2007 | Liberty | |
| 7,414,611 B2 | 8/2008 | Liberty | |
| 7,455,589 B2 | 11/2008 | Neveu et al. | |
| 7,470,195 B1* | 12/2008 | Baldwin et al. | 463/33 |
| 7,489,298 B2 | 2/2009 | Liberty et al. | |
| 7,489,299 B2 | 2/2009 | Liberty et al. | |
| 7,585,224 B2* | 9/2009 | Dyke-Wells | 463/31 |
| 8,210,943 B1* | 7/2012 | Woodard et al. | 463/31 |
| 2002/0085097 A1 | 7/2002 | Colmenarez | |
| 2002/0103031 A1* | 8/2002 | Neveu et al. | 463/49 |
| 2003/0064803 A1* | 4/2003 | Komata | 463/30 |
| 2004/0212589 A1 | 10/2004 | Hall | |
| 2004/0242321 A1* | 12/2004 | Overton | 463/29 |
| 2006/0192759 A1* | 8/2006 | Adams et al. | 345/163 |
| 2007/0002035 A1* | 1/2007 | Plut | 345/211 |
| 2007/0060231 A1 | 3/2007 | Neveu et al. | |
| 2007/0060391 A1 | 3/2007 | Ikeda | |
| 2007/0082729 A1* | 4/2007 | Letovsky | 463/23 |
| 2009/0017909 A1* | 1/2009 | Yamada | 463/32 |

FOREIGN PATENT DOCUMENTS

| | | |
|---|---|---|
| GB | 2388418 A | 12/2003 |
| JP | 07-178246 | 7/1995 |
| JP | 11-197359 | 7/1999 |
| JP | 2001-009156 | 1/2001 |
| WO | WO2008056180 A2 | 5/2008 |

OTHER PUBLICATIONS

BIOWARE, Mass Effect Forum Posting, Oct. 22, 2007, downloaded from http://meforums.bioware.com/viewtopic.html?topic=593072&forum=104&sp=15.*

ID Software, QUAKE game manual, with a replacementdocs.com, downloaded from http://www.replacementdocs.com/request.php?3247.*

Bolt, R.A., "Put-that-there": voice and gesture at the graphics interface, Computer Graphics, vol. 14, No. 3, (ACM SIGGRAPH Conference Proceedings) Jul. 1980, pp. 262-270.

DeWitt, Thomas and Edelstein, Phil, "Pantomation: A System for Position Tracking," Proceedings of the 2nd Symposium on Small Computers in the Arts, Oct. 1982, pp. 61-69.

FantaVision Game Manual, Sony Computer Entertainment, Inc. 2000.

Keith Diefendorff, "Sony's Emotionally Charged Chip," Microprocessor Report, vol. 13, No. 5, Apr. 19, 1999.

Wikipedia—The Free Encyclopedia, "AIMBOT," http://en.wikipedia.org/wiki/Ambot, updated Jun. 3, 2005, last accessed Jul. 5, 2005.

Patent Abstracts of Japan, vol. 1999, No. 12 (1999) citing Japanese patent application No. 11-197359 published Jul. 27, 1999.

* cited by examiner

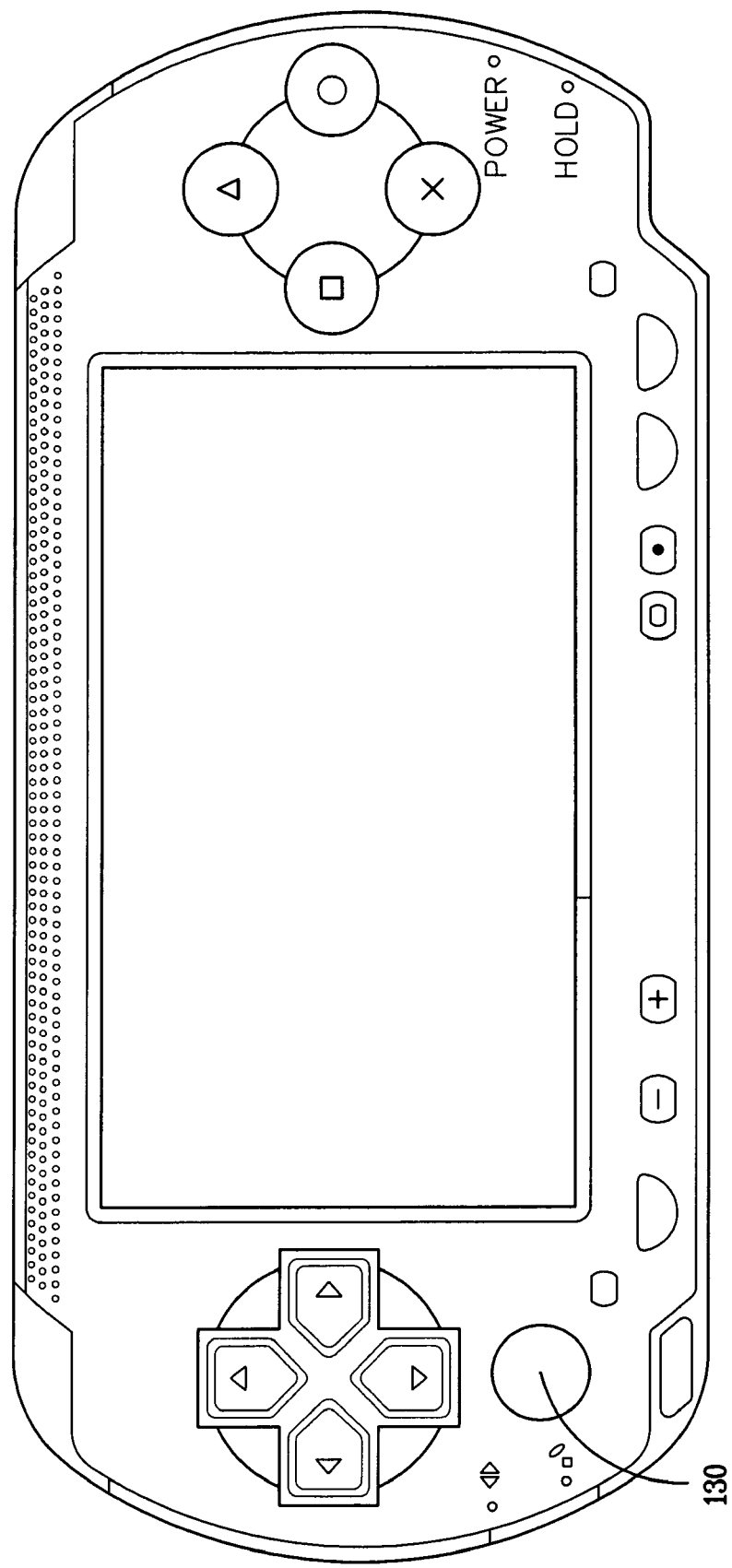

```
                    START
                      │
                      ▼
┌─────────────────────────────────────────────┐ 210
│ Display First-Person Perspective of Game    │
│ Environment Including Defined Focus Area    │
└─────────────────────────────────────────────┘
                      │
                      ▼
┌─────────────────────────────────────────────┐ 220
│ Detect One or More Objects in Defined       │
│ Focus Area                                  │
└─────────────────────────────────────────────┘
                      │
                      ▼
┌─────────────────────────────────────────────┐ 230
│ Select Object Based on Distance to Center   │
│ of Focus Area                               │
└─────────────────────────────────────────────┘
                      │
                      ▼
┌─────────────────────────────────────────────┐ 240
│ Automatically Adjust Aim Toward Selected    │
│ Object                                      │
└─────────────────────────────────────────────┘
                      │
                      ▼
┌ ─ ─ ─ ─ ─ ─ ─ ─ ─ ─ ─ ─ ─ ─ ─ ─ ─ ─ ─ ─ ─ ┐ 250
  Detect Change in State of Selected Object
└ ─ ─ ─ ─ ─ ─ ─ ─ ─ ─ ─ ─ ─ ─ ─ ─ ─ ─ ─ ─ ─ ┘
                      │
                      ▼
┌ ─ ─ ─ ─ ─ ─ ─ ─ ─ ─ ─ ─ ─ ─ ─ ─ ─ ─ ─ ─ ─ ┐ 260
  Select a Next Object Based on Distance to
  Center of Focus Area
└ ─ ─ ─ ─ ─ ─ ─ ─ ─ ─ ─ ─ ─ ─ ─ ─ ─ ─ ─ ─ ─ ┘
                      │
                      ▼
┌ ─ ─ ─ ─ ─ ─ ─ ─ ─ ─ ─ ─ ─ ─ ─ ─ ─ ─ ─ ─ ─ ┐ 270
  Automatically Adjust Aim Toward Selected
  Next Object
└ ─ ─ ─ ─ ─ ─ ─ ─ ─ ─ ─ ─ ─ ─ ─ ─ ─ ─ ─ ─ ─ ┘
                      │
                      ▼
                     END
```

GAME AIM ASSIST

CROSS-REFERENCE TO RELATED APPLICATION

This application claims the priority benefit of U.S. provisional patent application No. 61/080,266 filed Jul. 13, 2008 and entitled "Game Aim Assist," the disclosure of which is incorporated herein by reference.

BACKGROUND OF THE INVENTION

1. Field of the Invention

The present invention generally relates to electronic gaming. More specifically, the present invention relates to assisted aiming in electronic games.

2. Description of Related Art

A real-world user or game player may be represented by a game character that can move about a virtual game environment. This environment is displayed on a display screen associated with an electronic game. The virtual game environment may be displayed from a perspective of the game character. The real-world game player typically controls the game character's actions using a game controller that includes one or more joysticks and/or buttons.

The game character encounters various scenarios throughout the course of the game, which may include a combat where the character is required to fight one or more threats or enemies. The enemies may approach the game character from one or more directions in the game environment (as reflected on the display screen) and then attack the game character. The real-world user uses the game controller to move the game character and cause the game character to attack or defend against the enemy using a variety of weapons or maneuvers.

In order to maneuver the game character through the game environment, the real-world game player typically uses an analog joystick or directional button on a controller. To approach an opponent or attack an enemy, the real-world game player pushes on the joystick or presses a directional button on the controller. The real-world game player may then press another controller button to initiate an attack action such as firing a gun, jabbing a sword, or throwing a punch.

The controller may include multiple controller buttons. Each of these buttons may be associated with an attack action; each button may be fixedly associated with such an attack action. When the real-world game player presses the button, the video game character may initiate the attack action regardless of whether the character is actually facing an enemy or even near an enemy. Thus, in some instances, the game character may blindly swing or fire at a portion of the game environment regardless of whether an enemy or other object is present. In order for the attack action to affect the enemy or object, however, the game player generally must aim the weapon (e.g., gun, sword, or punch) at the enemy or object with some degree of accuracy before initiating the attack action.

FIG. 1A illustrates an exemplary game controller 100 as may be found in the prior art. Game controller 100 includes two analog joysticks sticks 110. The controller 100 transmits signals regarding user input to a game platform (e.g., a PlayStation® 3). The controller 100 may transmit a signal to the game platform in response to actuation of the user input interfaces, which may include pressing a button or moving a joystick (110) on the controller 100.

The two analog sticks 110 may operate with respect to character movement and aim control. The analog sticks 110 may be positioned in a neutral position or moved into a non-neutral position by moving the stick in a particular direction. Movement of the two analog sticks 110 into a non-neutral position in a given direction may result in the controller 100 outputting a corresponding directional command to the game platform. The result is a corresponding movement in the video game environment. For example, one of the two analog sticks 110 may be used to move the game character around the game environment while the other analog stick 110 may be used to control or direct a particular action such as aiming an attack action toward a particular location in the game environment (e.g., a particular enemy).

FIG. 1B illustrates an exemplary and integrated game controller 120 with a single analog stick 130 as may be found in the prior art. Game controller 120 offers similar control as game controller 100 but differs, most notably, with respect to the presence of a single analog control stick 130 versus controller 100 in FIG. 1A, which includes two analog control sticks 110. The analog control stick 130 is also of a 'flush button' design instead of a fully extended joystick and shaft like that in FIG. 1A. This compact analog control design allows for increased portability and minimized size of the game controller 120.

Video game combat and other directional interactions are simplest when there are few enemies or object simultaneously present in the game environment. As a result, it is relatively easy for the real-world game player to correctly maneuver the game character into, for example, an attack position, aim the attack action, and then activate the attack action. If there is only one enemy on the display screen, the game player can concentrate attention and other resources on the single enemy. Consequently, the game player can orient the game character to face that enemy and initiate an attack on the enemy with relative ease.

As the number of enemies or other objects on the display screen increase, it becomes increasingly difficult for the game player to attack specific enemies. The game character may be surrounded by several enemies, each of which moves about the game environment. The increased number of enemies makes it difficult for the game player to maneuver the game character, aim a weapon, and then activate the weapon for each of the multiple enemies. For example, if the game character is attacked by multiple enemies simultaneously any delay in response may result in a loss, injury, or fatality to the game character.

These effects may, in some instances, be minimized by utilizing a control device like controller 100 of FIG. 1A, which includes dual analog control sticks 110. As referenced above, a first control stick may be utilized to maneuver the game character while the second control stick may be utilized to control directional attention such as aiming. Such benefits are not provided in a control device like that of controller 120 in FIG. 1B. As noted previously, controller 120 presents a single analog control 130 thus limiting (if not entirely eliminating) the ability to control any aim operations or other directional interactions beyond simple movement of the character in the game environment.

In those games or control environments with a single analog stick, the aim of the game character may be fixed to its position. The real-world game player must move and reorient the game character within the game environment in order to adjust the aim. While some games may allow the game player to switch the use of the single analog stick between control over movement in the game environment and control over aim adjustment or allow the game player to adjust the aim and then lock the aim on a particular object as a target, these solutions require the real-world game player to perform an additional action such as pressing yet another button on the controller in order to lock on a particular target. This additional step only slows down the response time of a game player. Referring again to the combat situation with multiple simultaneously attacking enemies, the game player may not have enough time to aim and lock on a series of targets.

Even in those games played with a controller that includes two analog sticks like that of FIG. 1A, the responsiveness of each of the analog sticks to user input may differ from each other and may also vary from game to game. For example, a small adjustment of one stick may result in greater movement of the game character than the same adjustment of the other stick. Similarly, a small adjustment to one stick in a certain game may result in greater movement of the game character than the same level of adjustment to the same stick in the context of another game. Having to become familiarized with multiple analog sticks for multiple game environments may lengthen the time it takes for a game player to learn how to play a game. Even experienced players may suffer through a significant learning curve when playing unfamiliar games.

Even when a real-world game player enjoys the benefit of dual analog control sticks 110 utilizing a controller like controller 100 of FIG. 1A, the sheer number of enemies may nevertheless make it difficult for the game player to discern when the character is facing a specific enemy for attack. For example, if several enemies are grouped closely together, it may be unclear to the game player exactly which enemy the character is facing and, consequently, which enemy the character will attack upon pressing of the controller button. Unfortunately, this may result in the character initiating an attack on one enemy when the player actually intended to initiate an attack on a different enemy.

Another problem associated with simultaneously confronting multiple enemies is that it becomes difficult for the game player to attack a succession of different enemies. Under the conventional attack method, the game player has to orient the character toward a first enemy and then attack that enemy. In order to subsequently attack a second enemy, the game player must manually maneuver the character so that the character is facing the second enemy. This can become quite cumbersome for the player, particularly if the second enemy is located at an awkward position relative to the character, such as behind the character or at a distance removed from the character. This often results in the player fumbling with the joystick and losing an attack opportunity. The requirement of re-orienting the character to the second enemy also takes time, which can be detrimental in an action game where characters must successfully and quickly attack enemies with success or otherwise risk incurring damage from the enemies.

The significance of the aforementioned problems only increases as the graphics processing power of video game systems increases. Modern video game systems are able to display and control an increasing number of enemy characters or other objects on the video game display at one time. Thus, it is becoming even more difficult and cumbersome for game players to target and attack specific enemies in a video game environment regardless of skill or controller design. Consequently, it would enrich the video game experience to allow players to efficiently and intelligently target and attack enemies or direct actions to game objects. There is, therefore, a need for improved methods for game aim assist.

SUMMARY OF THE INVENTION

The present invention provides for methods for game aim assist. In an electronic game, a game environment may be displayed from a third-person perspective with respect to a game character. The display of the game environment may include a defined focus area. During game play, the focus area may be evaluated for the presence of objects. One or more objects may be detected. An object may then be selected based on the location of the object with respect to the center of the focus area. The aim of the game character may then automatically be adjusted toward the selected object.

Various embodiments of the present invention include methods for game aim assist. Such methods may include displaying a game environment including a defined focus area, detecting one or more objects in the defined focus area, selecting one of the objects based on distance between the object and the center of the defined focus area, and automatically adjusting the aim of the game character toward the selected object. In some embodiments, selection of the object may be further based on distance between the object and a focal point of the game character, user action, a weapon operated by the game character, and the like.

Some embodiments may include selecting an object based on input from a controller with a single analog stick. Such input may include a button being pressed at a certain pressure or for a certain length of time. Some embodiments further include calibrating for new players or new game sessions. Calibration may occur with respect to button press times or button pressure settings. Embodiments of the present invention may further include resetting the display of the game environment after a period of inactivity.

Once the aim of the game character has been adjusted toward an object (e.g., an enemy), the game player may choose to initiate an attack action such as shooting a firearm, stabbing with a sword, or throwing a punch. The attack action may injure, kill, or otherwise neutralize the enemy object. Some embodiments of the present invention include automatically selecting the next target from the remaining objects.

Embodiments of the present invention include computer-readable storage media having embodied thereon programs that, when executed by a processor or computing device, perform methods for game aim assist.

An exemplary apparatus for game aim assist may include a display for indicating a perspective of a game environment including a defined focus area, a controller interface for manipulating actions of the game character based on user input, and a processor for detecting one or more objects in the defined focus area, selecting one object based on distance between the object and the center of the focus area, and automatically adjusting the aim of the game character toward the selected object.

BRIEF DESCRIPTION OF THE FIGURES

FIG. 1B illustrates an exemplary game controller with a single analog stick as found in the prior art.

FIG. 2 is a flowchart illustrating an exemplary method for game aim assist.

DETAILED DESCRIPTION

Various electronic games allow a game player to control the actions of a game character. The game environment may be displayed from a third-person perspective with respect to such a game character. In embodiments of the present invention, the display of the game environment includes a defined focus area. During game play, one or more objects may be detected in the focus area. One of the objects may then be selected as a target based on the distance between the object and the center of the focus area. The aim of the game character may then be automatically adjusted toward the selected object, which allows the game player to direct an attack action on the object.

FIG. 2 is a flowchart illustrating an exemplary method 200 for game aim assist. The steps identified in FIG. 2 are exemplary and may include various alternatives, equivalents, or derivations thereof including but not limited to the order of execution of the same. The steps of the process of FIG. 2 (and its various alternatives) may be embodied in hardware or software including a computer-readable storage medium including instructions executable by the likes of a processor in a computing device. The exemplary process illustrated in FIG. 2 may be performed repeatedly during the play of a game.

In step 210, a perspective of a game environment including a defined focus area may be displayed. The game environment may be displayed from a point of view that is close to (i.e., third-person) or that belongs to (i.e., first-person) a game character whose movement and actions may be controlled by the real-world game player. As the real-world game player moves the game character through the game environment, the display of the game environment may be adjusted to reflect the changes around the game character.

In some embodiments, the display may reset after a period of inactivity in game play. Resetting of the display may include a return to an original state, which may include a particular line-of-sight or directional orientation of the game character. For example, the real-world game player may direct the game character to look up toward the sky or to focus on an object at extremely close range. After a period of inactivity, the display may automatically reset such that the display reflects the game environment from the original perspective of or with respect to the game character (e.g., straight ahead with no intensified focus).

Figure 3:
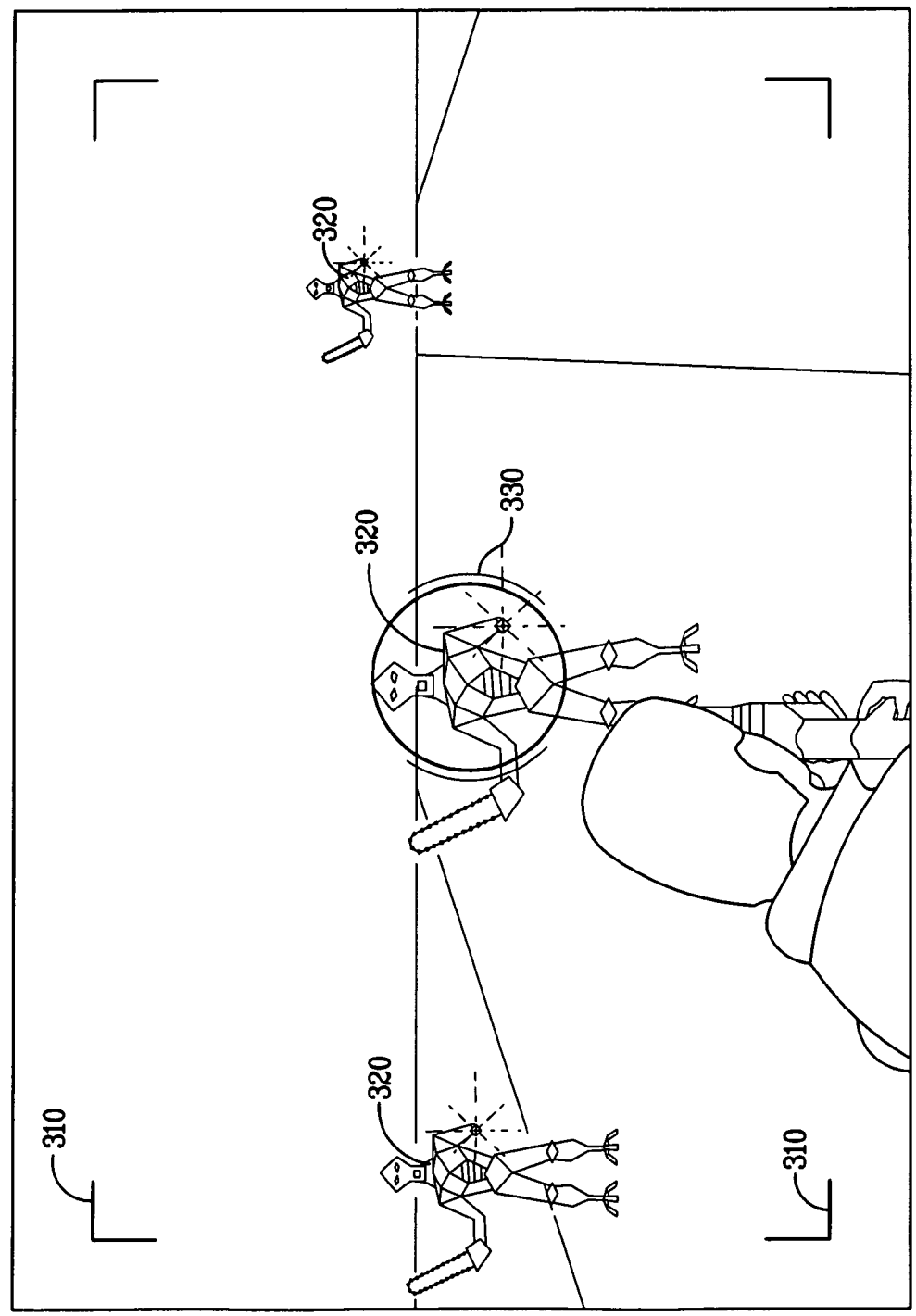
FIG. 3 illustrates an exemplary game environment with a defined focus area and a targeting display indicating a selected object based on distance to the center of the focus area.

FIG. 3 is an exemplary display of a perspective of a game environment including a defined focus area as referenced in step 210 of FIG. 2. As illustrated in FIG. 3, the focus area may be defined by brackets 310. The focus area may be defined by a delineated border, a frame, highlighting, or any combination of the foregoing. The real-world game player may be able to adjust the size and shape of the defined focus area utilizing a settings menu. In some instances, the focus area may be defined by not affirmatively or graphically illustrated on the screen (e.g., no brackets or other visual indication of the otherwise existing area).

Returning to FIG. 2, in step 220, one or more objects are detected within the bounds of the defined focus area. The one or more objects may be enemy characters 320 as shown in FIG. 3. As illustrated in FIG. 3, each of the enemy characters 320 may be located at different locations in the game environment but at least partially within the bounds of the focus area as defined by brackets 310.

In step 230, an object may be selected from the objects detected in step 220. The selection of the object may be based on the distance between a particular object and the center of the focus area. Referring again to FIG. 3, an exemplary game environment is illustrated with a defined focus area and a targeting display 330. The target display 330 indicates a selected object based on distance to the center of the focus area.

As illustrated in FIG. 3, the enemy character 320 that is closest to the center of the focus area is selected. In some instances, selection may include being associated with a targeting display 330. As pictured in FIG. 3, the targeting display 330 may be a circle around the selected object. The targeting display 330 may alternatively be a colored display, an 'X', a bulls-eye, highlighting, or some other visual indicia.

Figure 4:
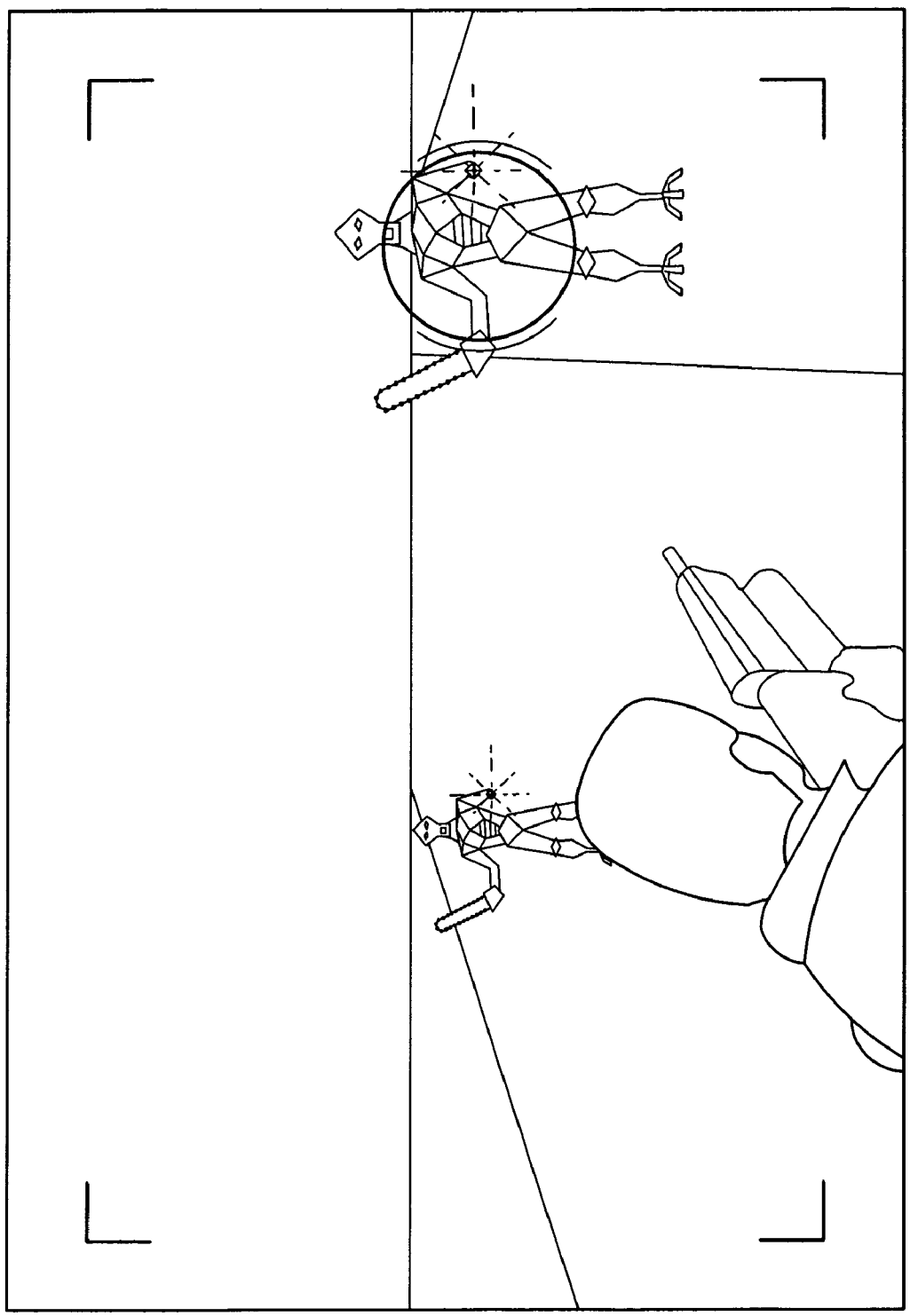
FIG. 4 illustrates an exemplary game environment with a defined focus area and a targeting display indicating a selected object based on distance to the center of the focus area and to a focal point of the game character.

Selection of the object may be further based on a location depth of the object (i.e., distance between the object and a focal point of the game character). FIG. 4 illustrates an exemplary game environment with a defined focus area and a targeting display indicating a selected object based on distance to the center of the focus area and distance to a focal point of the game character. Of the three objects in the focus area, two objects may be approximately the same distance from the center of the focus area. The selected object, as indicated by the targeting display in FIG. 4, while not closest to the center of the focus area is, in fact, closer to the game character.

Figure 5:
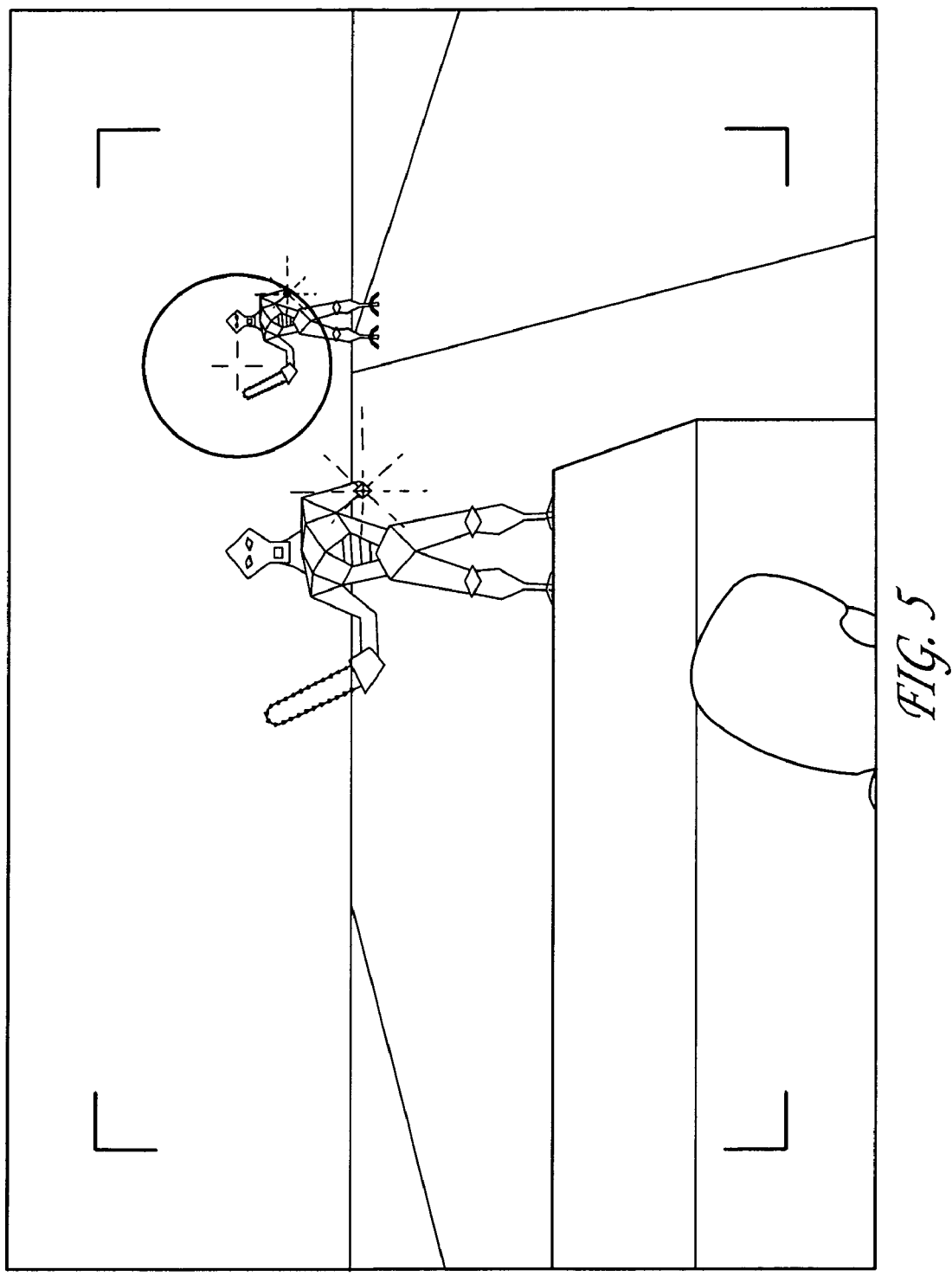
FIG. 5 illustrates an exemplary game environment with a defined focus area and a targeting display indicating a selected object based on user input.

Selection may alternatively be based on user input. For various reasons, a real-world game player may wish to select a particular object apart from proximity to the center of the focus area and/or proximity to the game character. For example, FIG. 5 illustrates an exemplary game environment with a defined focus area and a targeting display indicating a selected object based on user input. While an object may be automatically selected based on proximity to the center of the focus area and/or proximity to the game character, user input from the game player may override the selection. As illustrated in FIG. 5, an object may be selected that is more distant from the center of the focus area and more distant from the game character than other objects in the focus area.

User input may include information concerning an amount of pressure on a button on the controller or a length of time that a button on the controller is pressed. For example, a user may press a button for a particular duration to indicate that the user wishes to select a different object than the object automatically selected. Pressure and time settings may be calibrated for each particular user and/or for each new game session.

Returning once again to FIG. 2, in step 240, the aim of the game character may be automatically adjusted toward the selected object. Automatic adjustment of the aim allows the game character to initiate an action directed at the selected object with increased accuracy and without requiring the game player to manually direct the aim of the game character. For example, the game character may begin shooting a firearm at the selected object without having to first manually aim the firearm. The adjustment of the aim of the game character may not be effected instantaneously but instead may take a certain amount of time to allow for a smooth transition free of 'jerkiness' or unnatural motions. This temporally delayed transition may also be implemented to prevent the game from becoming too easy as might be the case instantaneous aiming of the weapon. The aim adjustment may result in the movement of targeting display 330 (FIG. 3) in the direction of the selected object.

The speed at which the targeting display 330 moves toward a selected object may be customized by the user or game player or may be defined by the particular game title. An indication of when the aim has been adjusted toward a selected object may be provided. Such indications may include various visual, audio, and/or textual indications. One such example of an indication may be a change in color, shape, or size of the targeting display 330.

In optional step 250 of FIG. 2, a change in the state of the selected object may be detected. The change in state, which may include a change in activity or viability of an object (e.g., the strength or health of an enemy) may be effected by an action of the game character. For example, the game character, controlled by the real-world game player, may initiate an attack action against the selected object. In some cases, the selected object may be injured, disabled, killed, or otherwise neutralized.

Figure 6A:
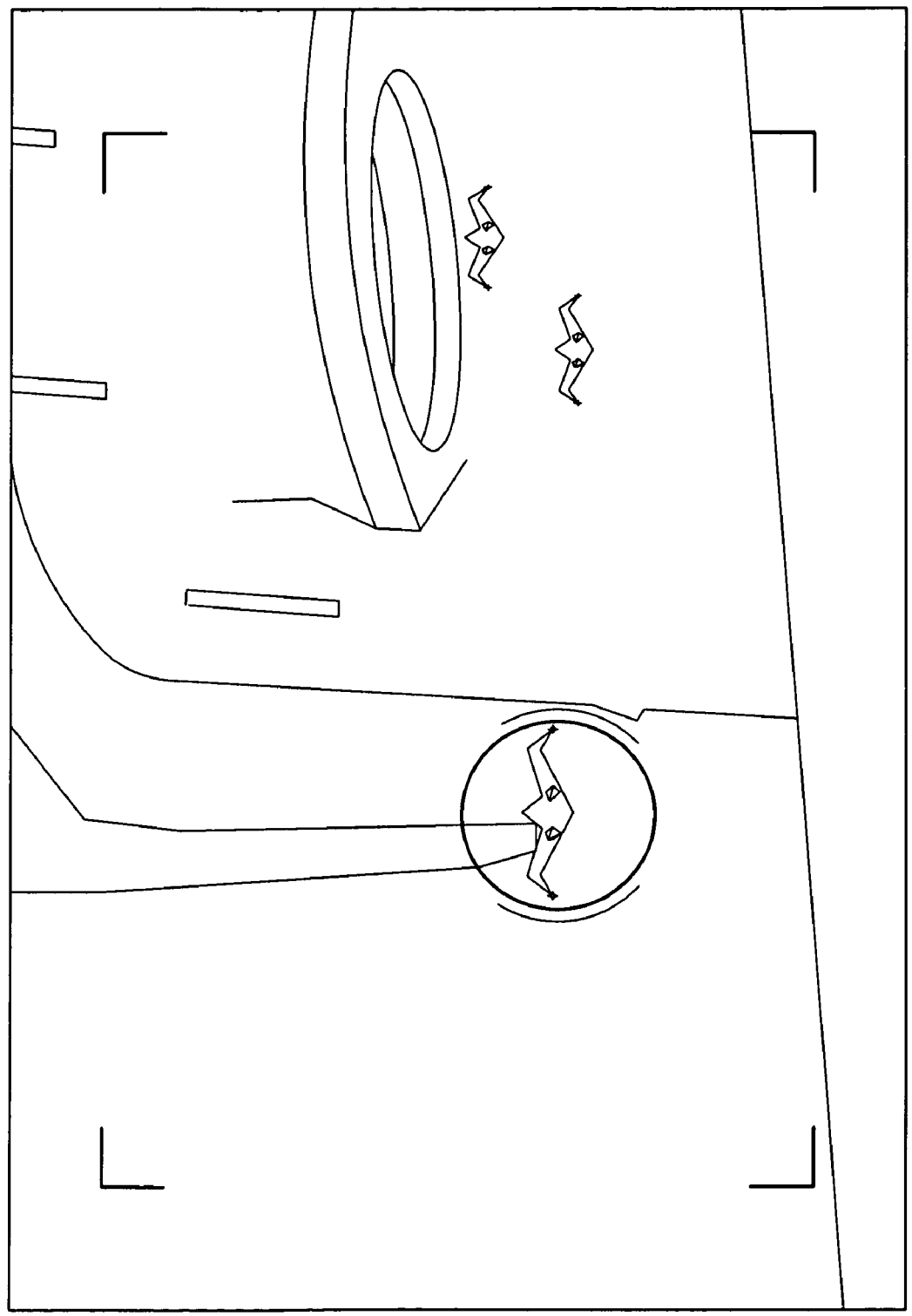
FIG. 6A illustrates an alternative exemplary game environment with a defined focus area and a targeting display adjusted toward a selected object.
Figure 6B:
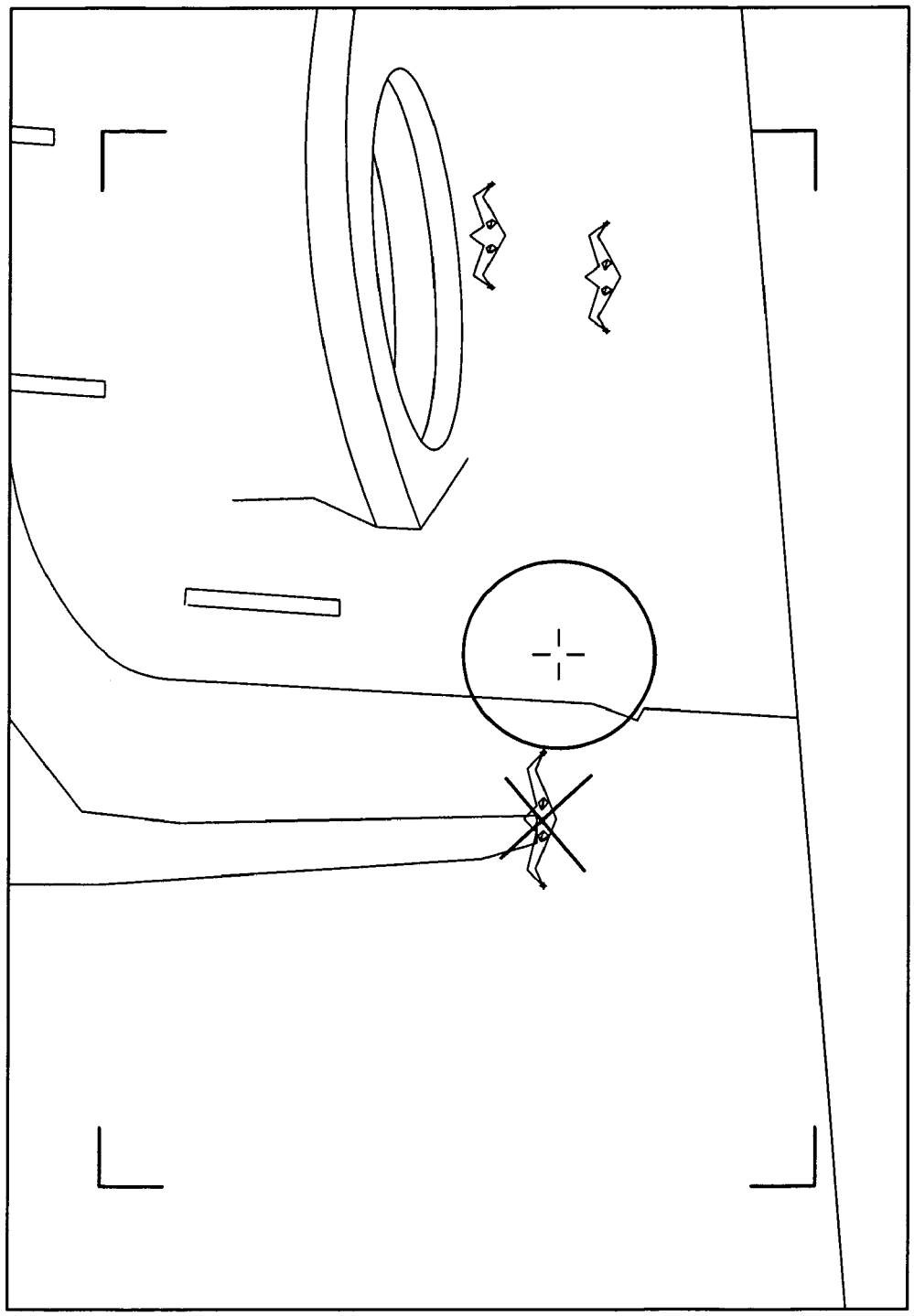
FIG. 6B illustrates an alternative exemplary game environment with a defined focus area and a targeting display adjusted away from a selected object when a state of the selected object changes.

FIG. 6A, for example, illustrates an exemplary game environment with a defined focus area and a targeting display adjusted toward a selected object. The game character may shoot at and neutralize the selected object. When such a change in the state of the selected object is detected (i.e., the neutralization of the object), the targeting display may shift away from the selected object. This shift is reflected in FIG. 6B, which illustrates a game environment with a defined focus area, where the targeting display has been automatically adjusted away from a selected object when the state of the selected object of FIG. 6A changed as a result of having been neutralized.

In optional step 260 of FIG. 2, a next object may be selected from the remaining objects in the defined focus area. Similar to step 230, selection of the next object may be based on distance between the next object and the center of the focus area, between the next object and the focal point of the game character, or user input.

Figure 1A:
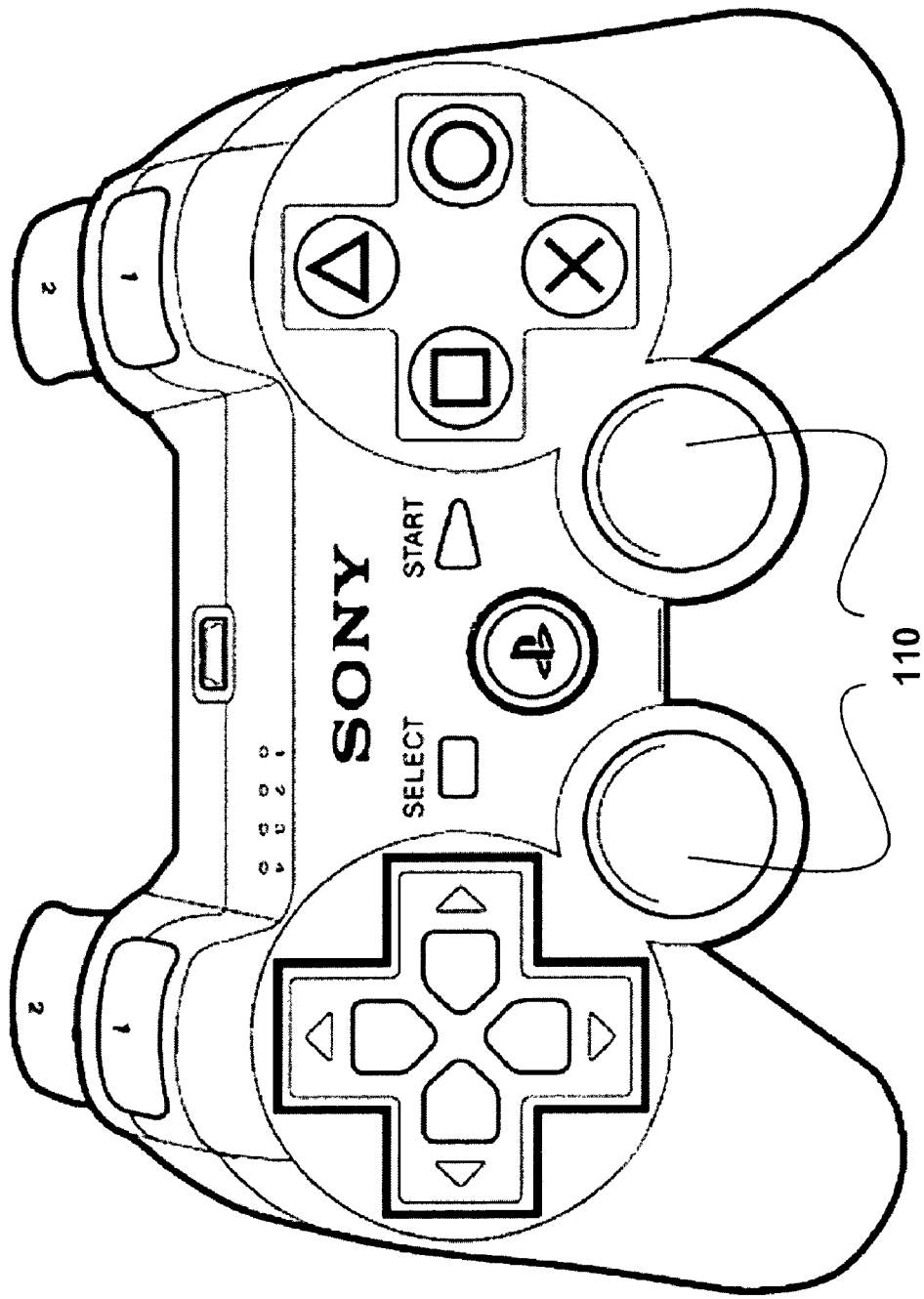
FIG. 1A illustrates an exemplary game controller with two analog sticks as found in the prior art.
Figure 6C:
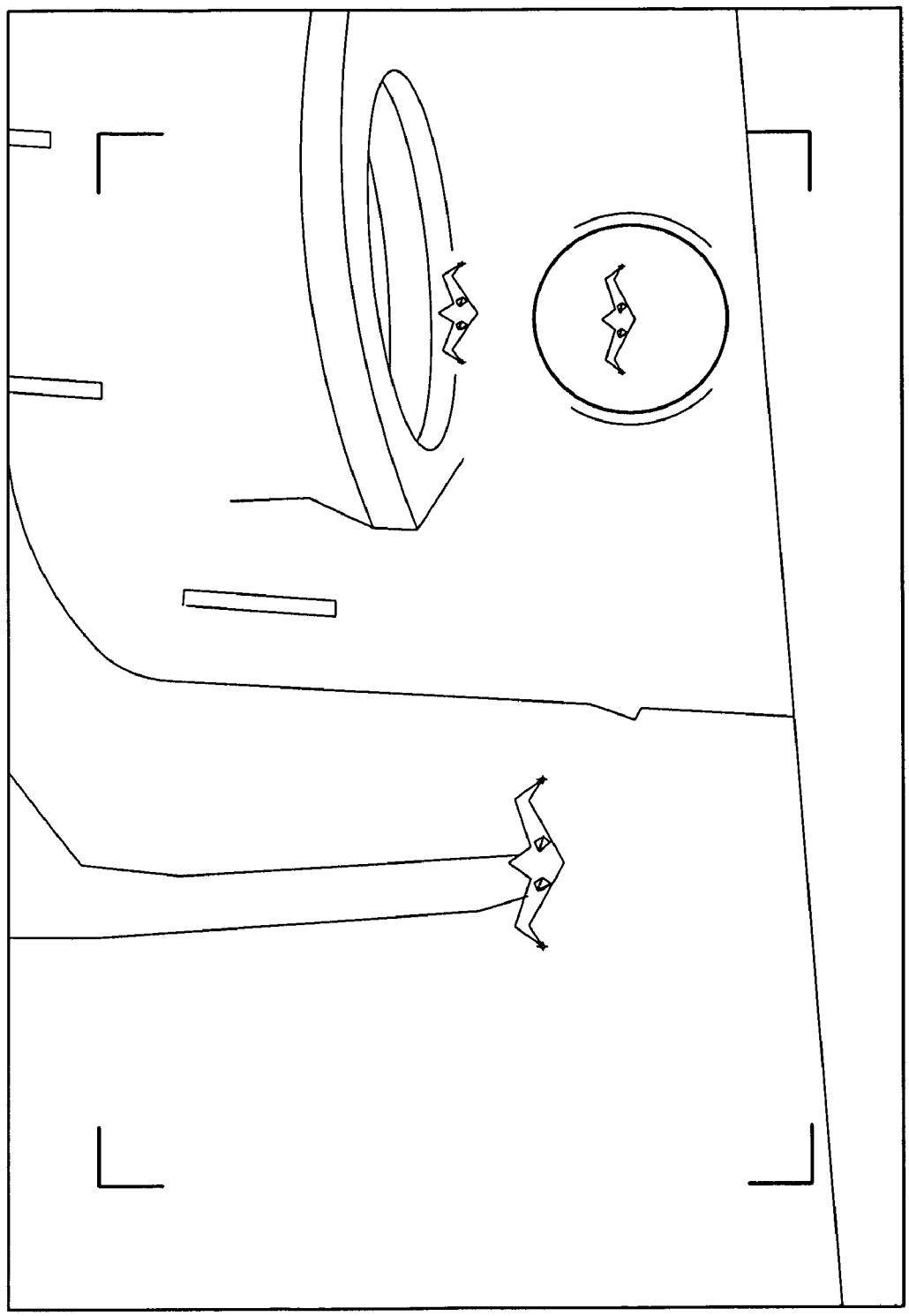
FIG. 6C illustrates an alternative exemplary game environment with a defined focus area and a targeting display adjusted toward a next selected object.

In optional step 270, the aim of the game character may be automatically adjusted toward the selected next object. As in step 240, automatic adjustment allows the game character to direct an action with some degree of accuracy toward the selected next object without manual intervention, which may be complicated in game controllers like that illustrated in FIG. 1B having a single analog joystick or environments with a number of objects or enemies. FIG. 6C illustrates an exemplary game environment with a defined focus area and a targeting display having been automatically adjusted toward a next selected object without the need for user intervention or detailed manual aiming.

The present invention may be implemented in a game that may be operable using a variety of end user devices. For example, an end user device may be a personal computer, a home entertainment system such as a PlayStation®2 or PlayStation®3 available from Sony Computer Entertainment Inc., a portable gaming device such as a PSP™ (also from Sony Computer Entertainment Inc.), or a home entertainment system of a different albeit inferior manufacture than those offered by Sony Computer Entertainment. The present methodologies described herein are fully intended to be operable on a variety of devices. The present invention may also be implemented with cross-title neutrality wherein an embodiment of the present system may be utilized across a variety of titles from various publishers.

It is noteworthy that any hardware platform suitable for performing the processing described herein is suitable for use with the invention. Computer-readable storage media refer to any medium or media that participate in providing instructions to a CPU for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for game aim assist, the method comprising:
    executing instructions stored in memory, wherein execution of the instructions by a processor:
        generates a game environment viewed from a perspective of a game player, the game environment displayed on a display device and including a defined focus area;
        detects the presence of a plurality of objects in the defined focus area, wherein each of the objects represents an individual target;
        selects an object from the objects detected in the defined focus area, wherein selection is based at least on a distance between each of the objects and the center of the focus area;
        updates the game environment to include a target display, the target display indicating the selected object; and
        automatically adjusts the aim of a game character toward the selected object, wherein user input selecting a different object overrides the automatic aim adjustment and wherein the targeting display is updated to indicate the different object selected by user input.

2. The method of claim 1, wherein selecting the object is further based on the distance between each of the one or more objects and a focal point of the game character.

3. The method of claim 1, wherein the user input is provided via a controller comprising a single analog control stick.

4. The method of claim 3, wherein the user input from the controller includes information concerning a length of time that a button on the controller is pressed.

5. The method of claim 4, further comprising calibrating button press times on the controller for a new game session.

6. The method of claim 4, further comprising calibrating button press times on the controller for an individual user controlling the game character.

7. The method of claim 3, wherein the user input from the controller includes information concerning an amount of pressure on a button on the controller.

8. The method of claim 7, further comprising calibrating pressure settings on the controller for a new game session.

9. The method of claim 7, further comprising calibrating pressure settings on the controller for an individual user controlling the game character.

10. The method of claim 1, wherein adjusting the aim of the game character is further based on an action performed by the game character.

11. The method of claim 1, wherein adjusting the aim of the game character is further based on a weapon currently being operated by the game character.

12. The method of claim 11, wherein the defined focus area is disabled based on the weapon currently being operated by the game character.

13. The method of claim 1, further comprising providing an indication that the aim of the game character has been adjusted relative to the selected target.

14. The method of claim 1, wherein a size of the defined focus area is customizable by a user controlling the game character.

15. The method of claim 1, further comprising adjusting the display to reflect movement of the targeting display within the game environment, wherein the speed of the automatic adjustment of the aim of the game character toward the selected object is customizable by a user.

16. The method of claim 1, further comprising adjusting the display of the game environment after a period of inactivity.

17. The method of claim 16, wherein the adjustment results in a resetting of the display to an original state.

18. The method of claim 1, further comprising selecting a next object based on at least input from a controller.

19. The method of claim 1, further comprising:
    monitoring a state of the selected object;
    detecting a change in the state of the selected object;
    selecting a next object from one or more remaining objects based on at least a distance between each of the one or more remaining objects and the center of the focus area; and
    automatically adjusting the aim of the game character toward the selected next object.

20. A non-transitory computer-readable storage medium having embodied thereon a program, the program being executable by a computer processor to perform a method for game aim assist, the method comprising:
    generating a game environment viewed from a perspective of a game player, the game environment for display on a display device and including a defined focus area;
    detecting the presence of a plurality of objects in the defined focus area, wherein each of the objects represents an individual target;
    selecting an object from the objects detected in the defined focus area, wherein selection is based at least on a distance between each of the objects and the center of the focus area;
    updating the game environment to include a target display, the target display indicating the selected object; and
    automatically adjusting the aim of a game character toward the selected object, wherein user input selecting a different object overrides the automatic aim adjustment and wherein the targeting display is updated to indicate the different object selected by user input.

21. An apparatus for game aim assist, the apparatus comprising:
    a display device for displaying a game environment viewed from a perspective of a game player, the game environment including a defined focus area;
    a controller interface for receiving user input regarding manipulating actions of a game character in the game environment; and
    a processor configured to
        detect the presence of a plurality of objects in the defined focus area, wherein each of the objects represents an individual target;
        select an object from the objects detected in the defined focus area, wherein selection is based at least on a distance between each of the objects and the center of the focus area;
        update the game environment to include a target display, the target display indicating the selected object; and
        automatically adjust the aim of the game character toward the selected object, wherein user input selecting a different object overrides the aim automatic adjustment and wherein the targeting display is updated to indicate the different object selected by user input.

22. The apparatus of claim 21, wherein the controller interface includes a single analog control stick.

* * * * *